(12) United States Patent
Clancy et al.

(10) Patent No.: US 7,671,327 B2
(45) Date of Patent: Mar. 2, 2010

(54) SELF CALIBRATING IRRADIATION SYSTEM

(75) Inventors: Michael Clancy, Westford, MA (US); Lewis Levine, Weston, MA (US)

(73) Assignee: Candela Corporation, Wayland, MA (US)

( * ) Notice: Subject to any disclaimer, the term of this patent is extended or adjusted under 35 U.S.C. 154(b) by 0 days.

(21) Appl. No.: 12/107,528

(22) Filed: Apr. 22, 2008

(65) Prior Publication Data

US 2009/0261239 A1 Oct. 22, 2009

(51) Int. Cl.
*G01D 18/00* (2006.01)
(52) U.S. Cl. .................................. 250/252.1
(58) Field of Classification Search ............. 250/252.1, 250/363.09; 606/12, 2
See application file for complete search history.

(56) References Cited

U.S. PATENT DOCUMENTS

| | | | |
|---|---|---|---|
| 3,983,753 A | 10/1976 | Greenleaf et al. | |
| 3,992,684 A | 11/1976 | Patrick et al. | |
| 4,580,557 A | 4/1986 | Hertzmann | |
| 5,002,051 A * | 3/1991 | Dew et al. ............. | 607/89 |
| 5,287,380 A | 2/1994 | Hsia | |
| 5,320,618 A | 6/1994 | Gustafsson | |
| 5,531,740 A | 7/1996 | Black | |
| 5,598,426 A | 1/1997 | Hsia et al. | |
| 5,772,656 A * | 6/1998 | Klopotek ............. | 606/12 |
| 5,798,518 A | 8/1998 | Coleman et al. | |
| 5,843,072 A | 12/1998 | Furumoto et al. | |
| 5,871,479 A | 2/1999 | Furumoto et al. | |
| 5,979,454 A | 11/1999 | Anvari et al. | |
| 6,015,404 A | 1/2000 | Altshuler et al. | |
| 6,045,548 A | 4/2000 | Furumoto et al. | |
| 6,228,075 B1 | 5/2001 | Furumoto | |
| 6,245,058 B1 * | 6/2001 | Suzuki ............. | 606/2 |
| 6,273,883 B1 | 8/2001 | Furumoto | |
| 6,299,307 B1 | 10/2001 | Oltean et al. | |
| 6,364,872 B1 | 4/2002 | Hsia et al. | |
| 6,485,413 B1 | 11/2002 | Boppart et al. | |
| 6,508,813 B1 | 1/2003 | Altshuler | |
| 6,511,475 B1 | 1/2003 | Altshuler et al. | |
| 6,512,782 B1 | 1/2003 | Hsia et al. | |
| 6,547,781 B1 | 4/2003 | Furumoto | |
| 6,610,052 B2 | 8/2003 | Furumoto | |
| 6,632,218 B1 | 10/2003 | Furumoto et al. | |
| 6,653,618 B2 | 11/2003 | Zenzie | |

(Continued)

FOREIGN PATENT DOCUMENTS

WO        WO 00/53261        9/2000

OTHER PUBLICATIONS

Miller et al., "5-J I.8-μsec pulse 10 pps dye laser for combustion applications." Applied Optics, vol. 21, No. 10, pp. 1764-1766, (1982).

(Continued)

*Primary Examiner*—David P Porta
*Assistant Examiner*—Kiho Kim
(74) *Attorney, Agent, or Firm*—Proskauer Rose LLP

(57) ABSTRACT

A self calibrating irradiation system is provided. The system includes sources for providing a calibration beam and a radiation beam, one or more detectors and a processor. A method of calibrating an irradiation system is also provided. The method includes measuring the energy of a calibration beam and periodically updating a transmission value of the laser system based on a calibration factor and the energy of the calibration beam.

20 Claims, 3 Drawing Sheets

U.S. PATENT DOCUMENTS

| | | |
|---|---|---|
| 6,676,655 B2 | 1/2004 | McDaniel |
| 6,829,260 B2 | 12/2004 | Hsia et al. |
| 6,878,144 B2 | 4/2005 | Altshuler et al. |
| 6,981,970 B2 | 1/2006 | Karni |
| 7,029,469 B2 | 4/2006 | Vasily |
| 7,137,979 B2 | 11/2006 | Conrad et al. |
| 7,309,335 B2 | 12/2007 | Altshuler et al. |
| 7,333,698 B2 | 2/2008 | Israel |
| 2003/0035449 A1 | 2/2003 | Tomlinson et al. |
| 2003/0144713 A1 | 7/2003 | Furumoto |
| 2006/0149343 A1 | 7/2006 | Altshuler et al. |
| 2006/0253176 A1 | 11/2006 | Caruso et al. |
| 2007/0060819 A1 | 3/2007 | Altshuler et al. |
| 2007/0067006 A1 | 3/2007 | Altshuler et al. |
| 2007/0078501 A1 | 4/2007 | Altshuler et al. |
| 2008/0004678 A1 | 1/2008 | Kreindel |
| 2008/0065059 A1 | 3/2008 | Lukowiak et al. |

OTHER PUBLICATIONS

Sierra, "Flashlamp—excited dye lasers achieve new performance levels." Laser Focus, vol. 24, No. 4, pp. 77, 78, 80, 82, 84, 86, 88, 90 and 91, (1988).

* cited by examiner

SELF CALIBRATING IRRADIATION SYSTEM

FIELD OF THE INVENTION

The invention relates generally to calibrating irradiation systems. More particularly, the invention relates to methods of calibrating laser systems by measuring the energy of a calibration beam and periodically updating a transmission value of the laser system based on a calibration factor and the energy of the calibration beam.

BACKGROUND OF THE INVENTION

Irradiation systems, such as laser systems, are used as therapeutic or diagnostic devices in a variety of medical procedures. Some of the medical procedures include treatment of skin disorders, skin rejuvenation and eye surgery. The energy of the laser is controlled and adjusted to maintain the reproducibility and consistency during such medical procedures. If the energy of the laser beam is higher than necessary, it can cause harmful effects to the patient.

The energy of the laser beam is typically controlled by calibrating the irradiation system prior to each use. A typical calibration method includes using a handpiece equipped with a distance gauge. The handpiece is placed into a calport which allows the internal energy meter to measure the laser output parameters. The handpiece may need to be kept in the calport for an extended period of time until the calibration is completed.

The calibration method presents several disadvantages. The procedure is tedious and time consuming. Since the procedure must be repeated frequently, it is cumbersome for the end user of the irradiation system. In addition, a sudden drop in the energy of the laser is not detected until the system is recalibrated. Such a sudden drop can lead to unsatisfactory results of the medical procedure. Failure to calibrate prior to each use may result in occasional delivery of excessive laser energy that can cause harmful and undesired treatment effects to the patient of the medical procedure.

SUMMARY OF THE INVENTION

The invention in one embodiment features a self calibrating laser system. The system can calibrate the energy of the laser either periodically or continuously. The system can cut-off the laser transmission if or when the energy of the laser is above or below a certain value. The invention eliminates or minimizes the need for a user to manually calibrate the system prior to each use on a patient.

In one aspect, the invention provides a method of calibrating an irradiation system. The method includes measuring the energy of a calibration beam. A calibration factor is calculated based on the energy of the calibration beam. The energy of a beam of radiation is adjusted based on the calibration factor. A transmission value of the irradiation system is periodically updated based on the calibration factor and the energy of the calibration beam.

In another aspect, the invention provides an apparatus for calibrating an irradiation system. The apparatus includes a first source for providing a calibration beam and a second source for providing a beam of radiation. The apparatus further includes a detector for measuring energy of the calibration beam. The apparatus also includes a processor in communication with the detector for (a) calculating a calibration factor based on the energy of the calibration beam, (b) adjusting energy of the beam of radiation based on the calibration factor, and (c) periodically updating a transmission value of the irradiation system based on the calibration factor and the energy of the calibration beam.

In yet another aspect, the invention provides a handpiece for delivering radiation generated by an irradiation system to a target. The handpiece includes a first means for transmitting a beam of radiation received from the irradiation system. The handpiece further includes a second means for at least partially transmitting and partially reflecting a calibration beam relative to the target. The handpiece also includes a third means for storing a transmission value of the irradiation system received from a processor. The processor periodically calculates the transmission value based on a calibration factor of the irradiation system and energy of the calibration beam.

In another aspect, the invention provides a method of calibrating an irradiation system. The method includes measuring the energy of a calibration beam. A calibration factor is calculated based on the energy of the calibration beam. The energy of a beam of radiation is adjusted based on the calibration factor. The transmission value of the irradiation system is continuously updated based on the calibration factor and the energy of the calibration beam.

In other examples, any of the aspects above, or any apparatus or method described herein, can include one or more of the following features. In some embodiments, the method can include storing the updated transmission value in a memory module. The memory module can include a rewritable memory chip. The method can include calculating the calibration factor based on a reference transmission value. The method can also include updating the energy of the beam of radiation based on the updated transmission value. The method can include measuring transmitted and reflected energy associated with the calibration beam. The method can include using an aiming beam to direct radiation generated by the irradiation system to a target. The aiming beam can be the calibration beam.

In certain embodiments, the apparatus can include at least one optical element. The at least one optical element can include a pair of convex lenses or a pair of mirrors. The apparatus can include a dichroic coated meniscus window for at least partially transmitting and partially reflecting the calibration beam. The apparatus can include a memory module for storing the updated transmission value. The memory module can include a rewritable memory chip. The detector can measure transmitted or reflected energy associated with the calibration beam. The detector can measure the transmitted and reflected energy of the calibration beam. The apparatus can include a third source for providing an aiming beam.

In various embodiments, the first means can include at least one optical element and the second means can include a dichroic coated meniscus window. The dichroic coated meniscus window can at least partially transmit and partially reflect the calibration beam. The third means can include a memory module. The memory module can include a rewritable memory chip.

Other aspects and advantages of the invention will become apparent from the following drawings and description, all of which illustrate the principles of the invention, by way of example only.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF THE INVENTION

Figure 1:
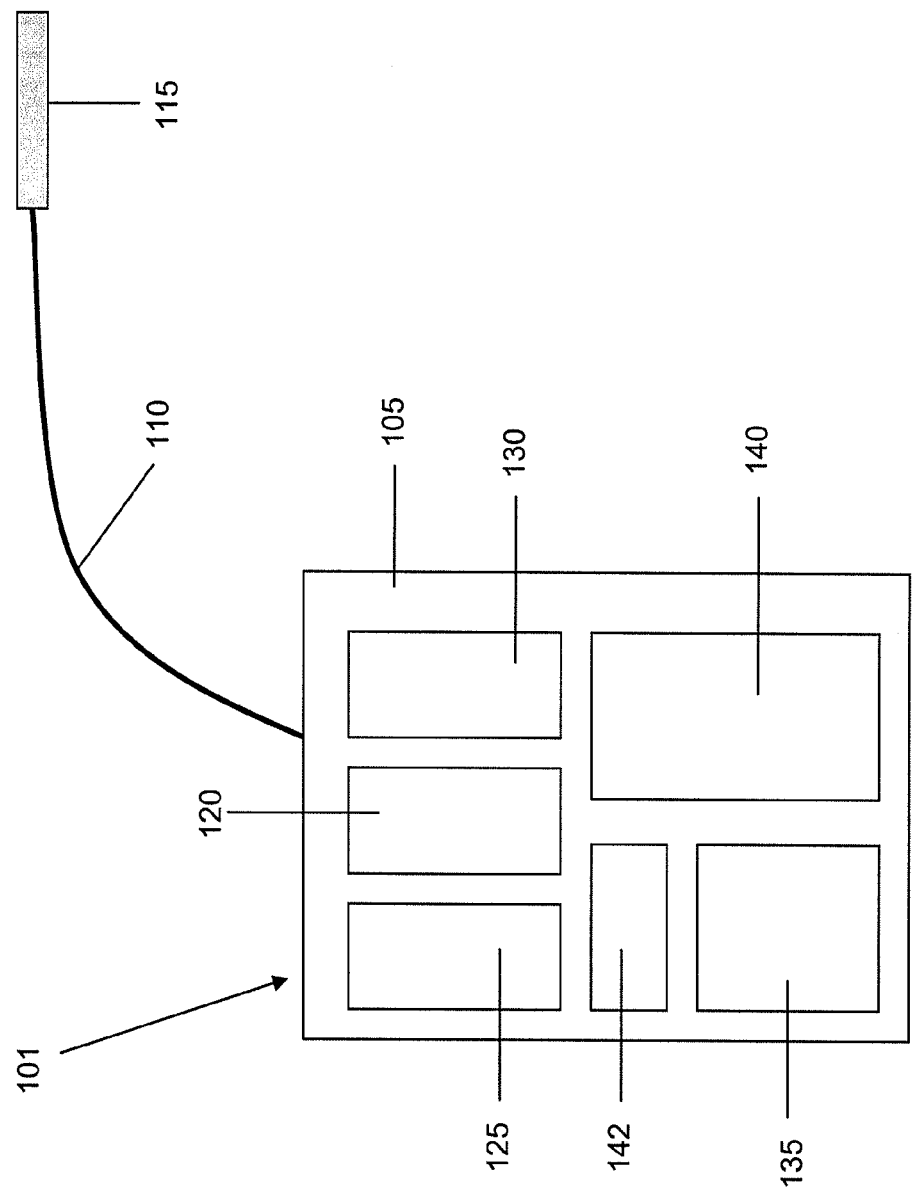
FIG. 1 shows an exemplary embodiment of an apparatus that can be used to calibrate irradiation systems.

FIG. 1 shows an exemplary embodiment of an apparatus 101 that can be used to calibrate irradiation systems. Apparatus 101 can include a base unit 105 coupled to an umbilicus 110, which is connected to a handpiece 115. The base unit 105 includes power source 120 that supplies power to a first energy source 125 and a second energy source 130 respectively. First energy source 125 can provide a calibration beam and second energy source 130 can provide a beam of radiation. The base unit 105 further includes a detector 135. The base unit 105 also includes a processor 140 in communication with detector 135. In some embodiments, the base unit 105 can include at least one optical element 142 (e.g., an optic or system of optics).

The power source 120 can be a battery that powers a diode, a laser diode, or a series of diodes. In various embodiments, the first and/or second energy sources 125 and 130 shown in FIG. 1, can be incoherent light sources, coherent light sources (e.g., a laser), microwave generators, or radio-frequency generators. In one embodiment, the first and/or second energy sources generate ultrasonic energy. In an embodiment using an incoherent light source or a coherent light source (for example, an intense pulsed light or fluorescent pulsed light source), the beam of radiation can be a pulsed beam, a scanned beam, or a gated continuous wave (CW) beam.

The detector 135 can be used to detect and/or measure the energy of the calibration beam and/or the beam of radiation. In some embodiments, the detector 135 can be a commercially available laser energy meter such as those made by Gentec, Inc., Sainte-Foy, Quebec, Canada. In some embodiments, the detector 135 can measure transmitted or reflected energy associated with either the calibration beam or the beam of radiation. In certain embodiments, the detector 135 can measure the transmitted and reflected energy of either the calibration beam or the beam of radiation. In various embodiments, the irradiation system can include a plurality of detectors, each measuring either the transmitted or the reflected energy of either the calibration beam or the beam of radiation.

Processor 140 can be a microprocessor or a similar device known in the art. Processor 140 can be suitable for calculating a calibration factor based on the energy of the calibration beam. Processor 140 can be further capable of adjusting energy of the beam of radiation based on the calibration factor. Processor 140 can also be capable of periodically updating a transmission value of the irradiation system based on the calibration factor and the energy of the calibration beam. In various embodiments, processor 140 can handle the above mentioned functions automatically. In certain embodiments, some or all of the above functions can be handled manually.

Optical element 142 can include a system of optics. The system of optics can include mirrors, lenses, prisms, galvanometers, acousto-optic devices, fiber optic splitters, integrated wave guide splitters, gratings, diffractive elements, multi-faceted optical components, free space beam splitters, microlens arrays or a combination of the afore mentioned devices. Optical element 142 can be moved or rotated to direct the calibration beam and/or beam of radiation as desired.

The umbilicus 110 can act as a conduit for communicating power, signal, fluid and/or gas between the base unit 105 and the handpiece 115. The umbilicus 110 can include a fiber to deliver the calibration beam and the beam of radiation from the base unit 105 to the handpiece 115.

Figure 2:
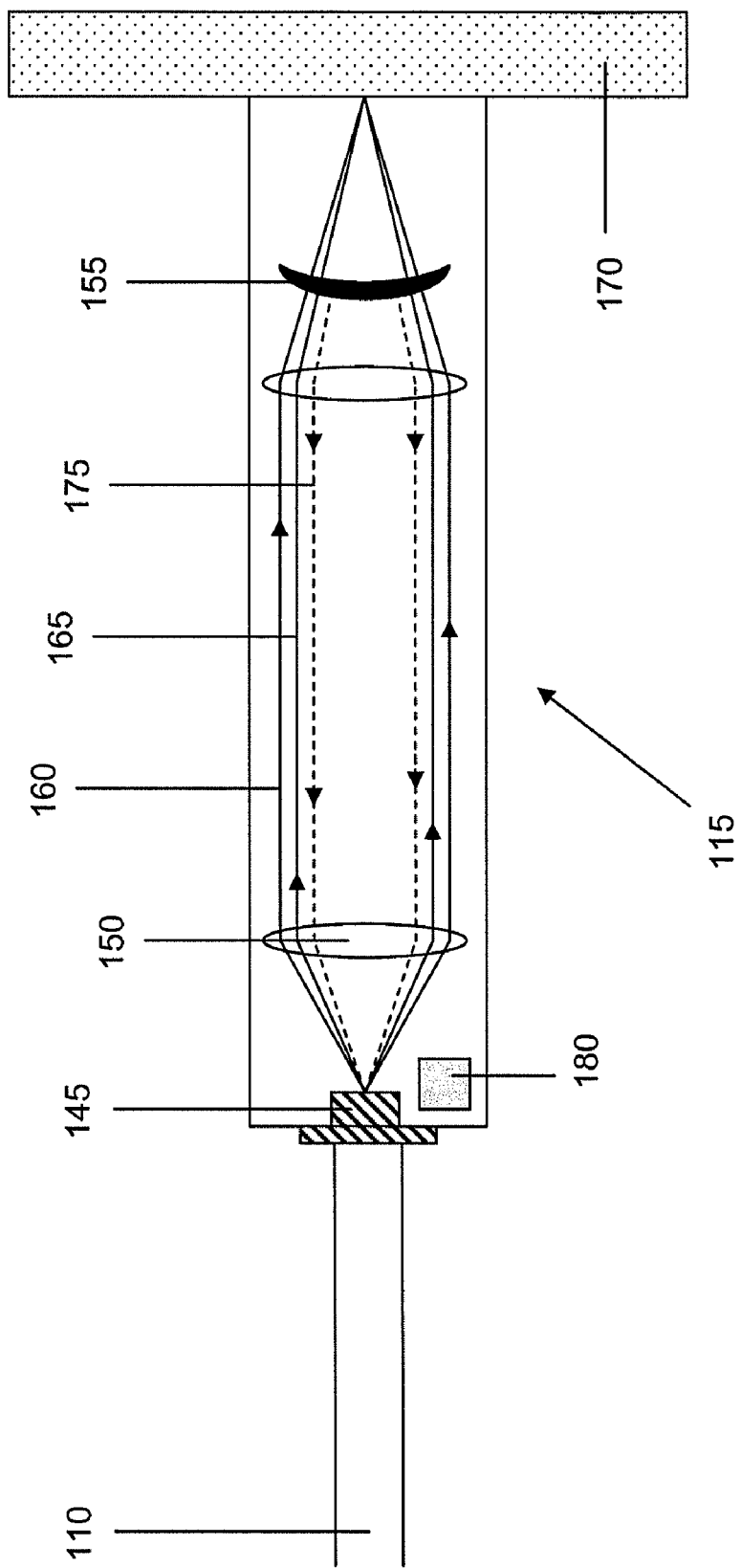
FIG. 2 shows an exemplary embodiment of a handpiece.

FIG. 2 shows an exemplary embodiment of the handpiece 115. Handpiece 115 can be connected to umbilicus 110 via a connector 145. In certain embodiments, connector 145 can be a coaxial RF connector such as SMA connector. The handpiece 115 can include at least one optical element 150 (e.g., an optic or system of optics) to control and/or manipulate the calibration beam and/or the beam of radiation to a target region. A user can hold or manipulate the handpiece 115 to irradiate the target region. In some embodiments, the optical element 150 can include a pair of convex lenses. In various embodiments, the optical element 150 can include a pair of mirrors. Handpiece 115 can further include a dichroic coated meniscus window 155. Window 155 can partially transmit and/or partially reflect the calibration beam and/or the beam of radiation. For example, the beam of radiation 160 and calibration beam 165 can be transmitted through the convex lenses 150 and window 155 to a target region of skin 170. The dichroic coated meniscus window 155 can partially reflect the calibration beam 165 as beam 175 which can then be transmitted through the convex lenses 150 to umbilicus 110 via connector 145.

Handpiece 115 can include a memory module 180. The memory module 180 can be used for storing the updated transmission value. In some embodiments, the memory module 180 can include a rewritable memory chip.

Each handpiece 115 can include a distinct label for identification purposes. In some embodiments, the label can be a serial number. The serial number can be recorded onto the memory module 180. A reference transmission value T1 can also be recorded onto the memory module 180. In various embodiments, T1 can be a standard value associated with the handpiece 115. In some embodiments, T1 can be assigned based on the optical element 150 and/or the dichroic coated meniscus window 155.

Figure 3:
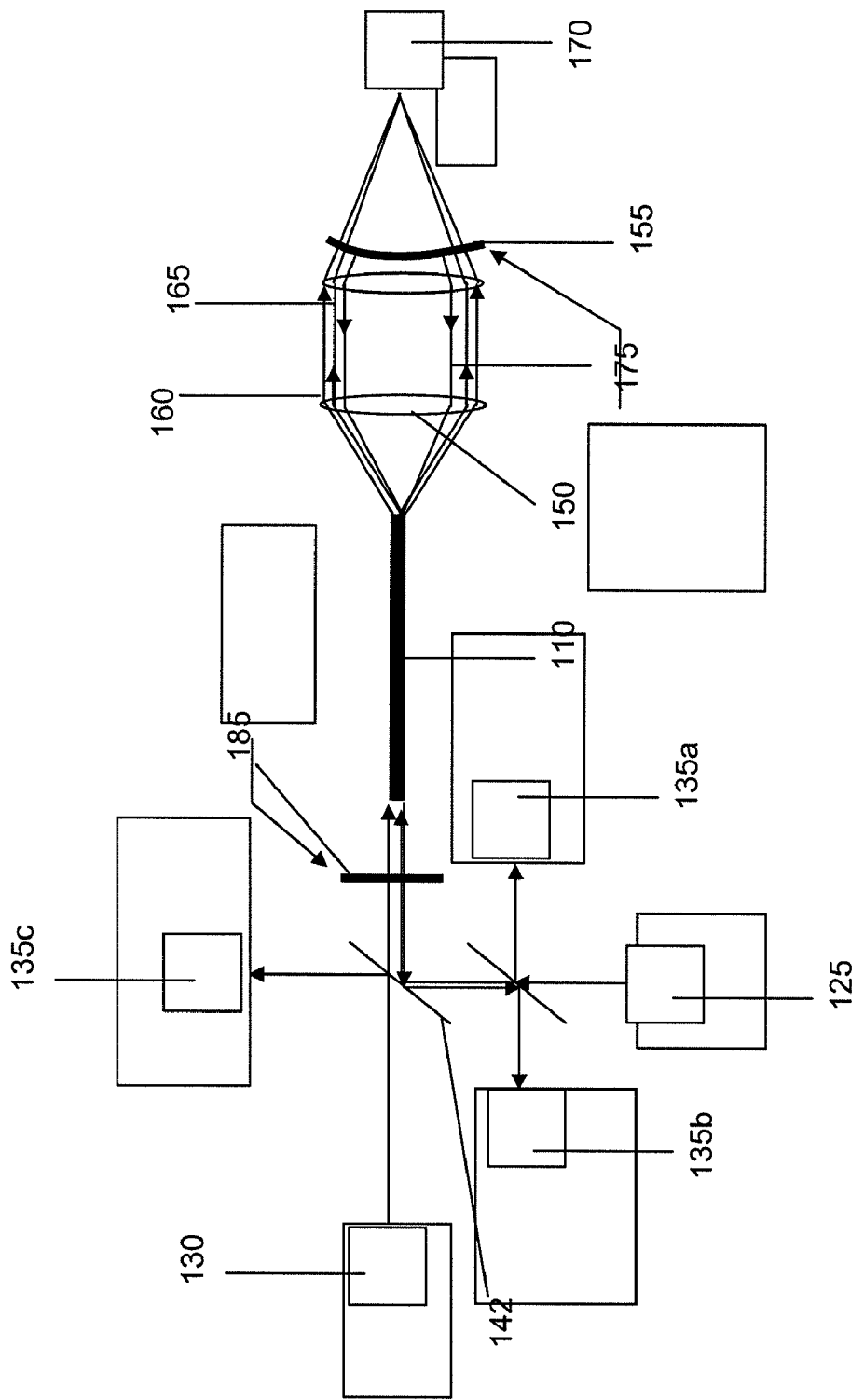
FIG. 3 shows an exemplary embodiment of the irradiation system during operation.

FIG. 3 shows an exemplary embodiment of the irradiation system during operation. In some embodiments, the system can include a beam shutter 185. Beam shutter 185 can be controlled to allow or stop the calibration beam and/or the beam of radiation to pass through. Beam shutter 185 can be made of appropriate commercially available material known in the art for the desired function. In various embodiments, beam shutter 185 can be made of ceramic material. In certain embodiments, beam shutter 185 can be in the base unit.

The initial calibration of the irradiation system can include powering on the calibration beam and the beam of radiation. The beam shutter 185 can be opened to allow the calibration beam and/or the beam of radiation to pass through. The detectors 135$a$ and 135$b$ can detect and/or measure the input energy Ain of the calibration beam and the output energy Aout of the calibration beam respectively. Accordingly, the input energy Ein of the beam of radiation can be detected and/or measured by detector 135$c$. Processor 140 can calculate a calibration factor F based on the values Ain and Aout using equation 1.

$$F = T1/(Aout/Ain) \qquad \text{Equation 1}$$

F can be calculated each time the irradiation system is powered on and/or when a new handpiece is installed. Beam shutter 185 can be closed and the processor 140 can adjust the Ein value using the equation 2.

$$Ein = Eout/T1 \qquad \text{Equation 2}$$

The irradiation system can be used for its intended purpose. In some embodiments, the system can be used for treating skin disorders and/or skin rejuvenation. During the operation of the system, an updated transmission value Tup can be continuously or periodically measured using the equation 3.

$$Tup = F \times Aout/Ain \qquad \text{Equation 3}$$

The updated transmission value Tup can be stored onto the memory module 180. The value Tup can be used by the processor 140 for further calibration of the irradiation system. For example, the energy of the beam of radiation can be updated using the Tup value. In various embodiments, an updated value of Ein can be calculated using the equation 4.

$$Ein = Eout/Tup \qquad \text{Equation 4}$$

Further calibration of the irradiation system can be carried out if/when the handpiece is installed or replaced. Further calibration can also be done when the system is shut down and reactivated for subsequent use. During further calibration of the system, the value of the calibration factor F can be updated using the equation 5.

$$F = Tup/(Aout/Ain) \qquad \text{Equation 5}$$

Tup is the last transmission stored in the delivery system. When the delivery system is new, Tup can be T1.

The delivery system can be damaged during storage, causing Tup to be inaccurate. To remedy this inaccuracy, the last calibration factor, F, can be written to the memory module 180. When a new calibration factor as calculated is different from the old stored value, the delivery system may have been damaged during storage. The irradiation system can cut off the laser transmission to prevent undesired treatment effect due to such a damaged delivery system.

In various embodiments, each of the calculations described above can be done and/or each of the values can be adjusted automatically by processor 140. In some embodiments, each of the calculations described above can be done and/or each of the values can be adjusted manually. In certain embodiments, some of the calculations described above can be done and/or some of the values can be adjusted automatically while the others can be adjusted manually.

In some embodiments, the base unit 105 can include a computer program and/or a mechanical device that can be manipulated by a user via a user interface. The user interface can include a touch screen, liquid crystal display, keypad, electrical connectors, wireless connection or a combination of the afore mentioned features. Other features and devices that are known in the art for controlling computer programs and mechanical devices can also be employed.

In certain embodiments, a single beam of radiation can be used for treatment, calibration or aiming, or any combination of the aforementioned. The single beam of radiation can operate in a dual cycle mode in which the beam operates in calibration mode in one cycle and in treatment mode in another cycle. In a calibration mode, the single beam of radiation can operate at a lower energy. In treatment mode, the single beam of radiation can operate at a higher energy. In such a dual cycle mode, the single beam of radiation can alternate between the two modes on every other pulse, or a number of high energy pulses for treatment followed by one low energy pulse for calibration/aiming.

In various embodiments, a method of calibrating the irradiation system can include a single beam of radiation operating in a dual cycle mode. The energy of a low energy pulse of the single beam of radiation can be measured for calibration. A calibration factor based on the energy of the low energy pulse can be calculated. The energy of a number of high energy pulses for treatment can be adjusted based on the calibration factor. A transmission value of the irradiation system can be continuously updated based on the calibration factor and the energy of the low energy pulse.

In some embodiments, a single beam of radiation can be used for treatment as well as continuous calibration. Optical elements 142, 150 and/or the dichroic coated meniscus window 155 can be adjusted to allow a portion of the single beam of radiation to be reflected and/or continuously detected by detector 135. Processor 140 can continuously update the calibration factor F. Accordingly, the value Tup can also be continuously updated. The remainder of the radiation can be transmitted to the target region. Thus, treatment and calibration can be accomplished concurrently, using a single beam of radiation.

For example, the portion of the single beam of radiation reflected and/or continuously detected by detector 135 can be about 0.1-10% of the total radiation. The portion of the single beam of radiation required for continuous calibration can depend on sensitivity of the apparatus. In certain embodiments, the single beam of radiation operating in a dual cycle mode can deliver radiation of the desired fluence to the target region. The ratio of the energy required for calibration to the total energy of the single beam of radiation operating in a dual cycle mode can be adjusted to account for slight changes in the voltage during time of treatment and/or calibration.

In some embodiments, a method of treating skin can include a single beam of radiation operating in a dual cycle mode. The energy of a low energy pulse of the single beam of radiation can be measured for calibration. A calibration factor based on the energy of the low energy pulse can be calculated. The energy of a number of high energy pulses for treatment can be adjusted based on the calibration factor. A transmission value of the irradiation system can be continuously updated based on the calibration factor and the energy of the low energy pulse. The continuously calibrated single beam of radiation can be delivered to the skin. In certain embodiments, the method of treating skin can include concurrently calibrating the single beam of radiation operating in a dual cycle mode.

In various embodiments, the dichroic coated meniscus window 155 can be electronically controlled to adjust the sensitivity modes. For example, the calibration beam can be reflected more efficiently during calibration. Similarly, the beam of radiation can be transmitted more efficiently during treatment.

In various embodiments, the beam of radiation can have a wavelength between about 400 nm and about 3,000 nm, although longer and shorter wavelengths can be used depending on the application. In some embodiments, the wavelength can be between about 1,000 nm and about 2,200 nm. In certain embodiments, the wavelength can be between about 1,160 nm and about 1,800 nm. In one embodiment, the wavelength is about 1,540 nm or about 1,450 nm. In some embodiments, the array of radiation beams can have a wavelength of about 1,200 nm to about 2,600 nm.

In various embodiments, the beam of radiation can have an energy of about 1 mJ to about 100 J, although the energy can be higher or lower depending on the application. In some embodiments, the beam of radiation can have an energy of about 5 mJ to about 1000 mJ. In certain embodiments, the beam of radiation can have an energy of about 7 mJ to about 500 mJ.

In various embodiments, the beam of radiation can have a fluence between about 1 J/cm$^2$ and about 500 J/cm$^2$, although higher and lower fluences can be used depending on the application.

In various embodiments, beam of radiation can have a pulse duration between about 10 μs and about 30 s, although larger and smaller pulse durations can be used depending on the application. In certain embodiments, beam of radiation can have a pulse duration of about 0.1 second and about 20 seconds.

While the invention has been particularly shown and described with reference to specific illustrative embodiments, it should be understood that various changes in form and detail may be made without departing from the spirit and scope of the invention.

What is claimed is:

1. A method of calibrating an irradiation system, comprising:
    calculating, at the irradiation system, a calibration factor for the irradiation system based on a first value of energy of the calibration beam;
    adjusting, at the irradiation system, input energy of a beam of radiation based on the calibration factor and a transmission value of the irradiation system;
    updating, at the irradiation system, the transmission value of the irradiation system based on the calibration factor and a second value of the energy of the calibration beam, the second value being less than the first value; and
    updating, at the irradiation system, the input energy of the beam of radiation, based on the updated transmission value, to calibrate output energy of the beam of radiation.

2. The method of claim 1 further comprising storing the updated transmission value in a memory module of the irradiation system.

3. The method of claim 2 wherein the memory module comprises a rewritable memory chip.

4. The method of claim 1 further comprising calculating, at the irradiation system, the calibration factor based on the transmission value.

5. The method of claim 1 further comprising measuring, at the irradiation system, transmitted and reflected energy associated with the calibration beam to calculate the calibration factor.

6. The method of claim 1 further comprising using an aiming beam of the irradiation system to facilitate direction of the treatment radiation generated by the irradiation system to a skin target.

7. The method of claim 6 wherein the aiming beam of the irradiation system is the calibration beam.

8. The method of claim 1 further comprising periodically updating, at the irradiation system, the transmission value of the irradiation system.

9. The method of claim 1 further comprising continuously updating, at the irradiation system, the transmission value of the irradiation system.

10. The method of claim 1 further comprising:
    directing the beam of radiation and the calibration beam toward a skin target to be treated by the beam of radiation;
    passing the beam of radiation to the skin target through a window; and
    reflecting the calibration beam using the window so that the first value and the second value of the calibration beam can be determined.

11. An apparatus for calibrating an irradiation system, comprising:
    a first source for providing a calibration beam and a second source for providing a beam of radiation;
    a detector for measuring energy of the calibration beam;
    a window including an optical coating adapted to transmit the beam of radiation and reflect the calibration beam; and
    a processor in communication with the detector for (a) calculating a calibration factor based on a first value of energy of the calibration beam reflected by the window, (b) adjusting input energy of the beam of radiation based on the calibration factor and a transmission value, (c) updating the transmission value of the irradiation system based on the calibration factor and a second value of the energy of the calibration beam reflected by the window, the second value being less than the first value, and (d) updating the input energy of the beam of radiation, based on the updated transmission value, to calibrate output energy of the beam of radiation.

12. The apparatus of claim 11 further comprising a memory module for storing the updated transmission value.

13. The apparatus of claim 12 wherein the memory module comprises a rewritable memory chip.

14. The apparatus of claim 11 wherein the detector measures the energy of the calibration beam reflected by the window.

15. The apparatus of claim 11 further comprising a third source for providing an aiming beam.

16. A handpiece for delivering radiation generated by an irradiation system to a target, the handpiece comprising:
    a first means for transmitting a beam of radiation received from the irradiation system;
    a second means for at least partially transmitting and partially reflecting a calibration beam relative to the target; and
    a third means for storing a transmission value of the irradiation system received from a processor, wherein the processor periodically calculates an updated transmission value based on a calibration factor of the irradiation system and energy of the calibration beam, and calibrates the output energy of the beam of radiation based on the updated transmission value.

17. The handpiece of 16 wherein the first means comprises at least one optical element and the second means comprises a dichroic coated meniscus window.

18. The handpiece of claim 17 wherein the dichroic coated meniscus window at least partially transmits and partially reflects the calibration beam.

19. The handpiece of 16 wherein the third means comprises a memory module.

20. The handpiece of claim 19 wherein the memory module comprises a rewritable memory chip.

* * * * *